No. 718,666. PATENTED JAN. 20, 1903.
R. H. SHOEMAKER, Jr.
FRUIT BOX.
APPLICATION FILED APR. 16, 1902.
NO MODEL.
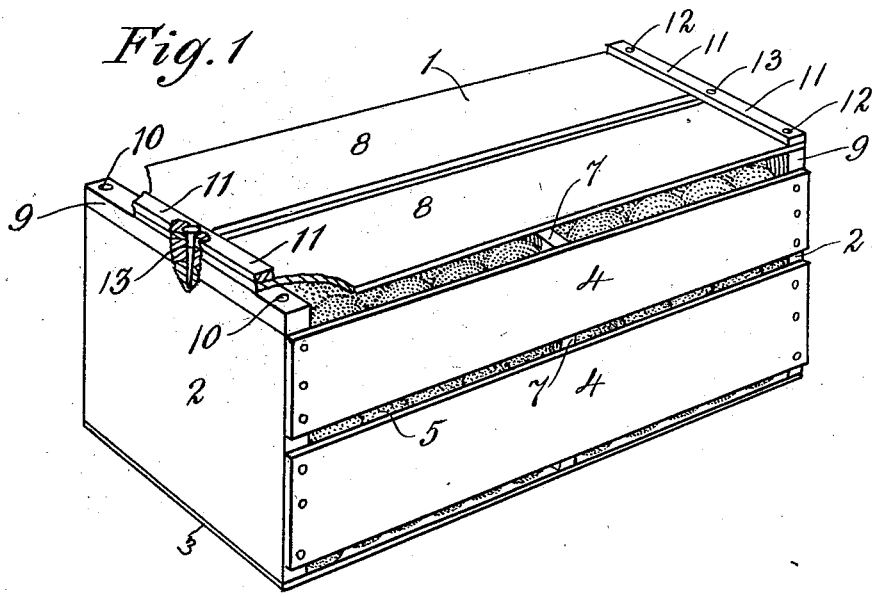
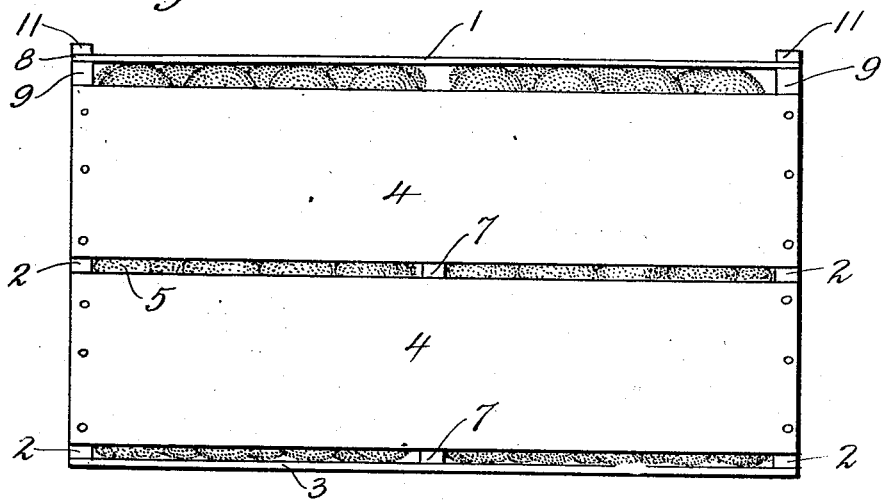
Witnesses
B. W. Pirce
J. B. Marlin.
Inventor
Reginald H. Shoemaker Jr.
by James R. Rogers
Attorney.

UNITED STATES PATENT OFFICE.

REGINALD H. SHOEMAKER, JR., OF CHICAGO, ILLINOIS.

FRUIT-BOX.

SPECIFICATION forming part of Letters Patent No. 718,666, dated January 20, 1903.

Application filed April 16, 1902. Serial No. 103,205. (No model.)

*To all whom it may concern:*

Be it known that I, REGINALD H. SHOEMAKER, Jr., a citizen of the United States, residing at Chicago, in the county of Cook, State of Illinois, have invented and discovered a new and useful Improvement in Fruit-Boxes, of which the following is a specification.

This invention relates to fruit boxes or crates.

It is my purpose to provide in fruit boxes or crates certain improved features of construction whereby oranges, lemons, or other fruit may be packed heaping full in a box and so as to stand above the top edge of the box, so that when the box is opened the fruit may be more readily exhibited and so that during package and transportation a proper space may be provided around the fruit in the top of the box to permit the desired and necessary ventilation.

Other important features or results due to the improved construction set forth herein are the avoiding of unnecessary compression and bruising of the fruit in the box incidental to the attachment of the cover.

Heretofore it has been customary to pack fruit-boxes heaping full and to then put on the cover and compress it down into engagement with the ends of the box, incidentally compressing and seriously bruising much of the fruit adjacent to the top, and particularly adjacent to the ends of the box. This undue compressing of the fruit results in the rupture of the cells and hastens fermentation and rot. By my invention this injury to the fruit from this cause is prevented and the healthy life of the fruit is prolonged.

Fruit-boxes are manufactured for commercial use on a very large scale and of standard dimensions, certain standard sizes being provided to contain a definite quantity of fruit. By my invention it is unnecessary to modify or change the prevailing custom as to the manufacture of these boxes, since said invention is applicable to any fruit box or crate irrespective of its size.

In the drawings, Figure 1 is a perspective view of a fruit-box constructed to embody my invention. Fig. 2 is a side elevation of the box shown in Fig. 1. Figs. 3 and 4 are perspective views of detailed construction.

1 is the top or cover of a fruit-box which, if desired, may comprise two slats 8 8.

2 2 are the end pieces of the box.

3 is the bottom of the box.

4 4 are slats constituting the sides of the box.

In the preferred construction the cover, sides, and bottom are preferably formed of slat-like pieces so arranged as to provide ventilating spaces or openings between them.

In the drawings, 5 is a ventilating-space between the slats 4 4. By means of these ventilating spaces or openings a proper circulation of air is afforded throughout the entire contents of the box.

7 is a partition which may be provided in long boxes midway of the ends.

In packing the box the cover is of course removed. The fruit, be it oranges, lemons, or any other fruit which it is desired to pack for shipment, is placed in the box, and the upper layers of the fruit extend above the top edge of both the sides and ends of the box. The cover is then applied, and a spacer-cleat, independent of both the cover and the box and of a thickness approximately equal to the distance between the upper edge of the box and the top of the fruit, is placed between the cover and the top edge of the box, preferably the end.

9 9 represent the spacer-cleats, and the same may be, if desired, lightly secured to the box by means of small nails 10 10, so as to be easily removable when the box is opened, or, as is preferable, the spacer-cleat is held in place by means of the same nails 12 13 employed to hold the cover to the box. The result is that in the packing of the fruit the cover need not be pressed down (so as to bruise and injure the fruit) when it is applied, but may be caused to merely rest lightly on the fruit, so as to hold it securely in place during transportation. When a crate of fruit reaches its destination and the cover is removed, the spacer-cleats are simultaneously removed, and the fruit will be found to stand above the top edge of the box and may be more readily inspected and exhibited than were it flush with the top of the box. It necessarily follows that because the fruit has not been unduly compressed or bruised the same arrives at its destination in a much more healthy condition than would be the case had it been necessary to compress the fruit in order to force the cover down into contact with the edge of the box above which the fruit stands. In the drawings I have shown another cleat 11 superposed on the cover-slats 8 8. In case the said slats 8 8 are thin it is desirable that these cleats 11 11 be employed. It is obvious that they are not essential. In the drawings the nails or fastenings 12 13, which removably hold the cover and spacer-cleats in place, are shown as passing through said cleats 11 11.

Having described my invention, what I claim, and desire to secure by Letters Patent, is—

1. A fruit box or crate comprising ends, sides, bottom and a removable cover and an independent spacer-cleat separating said cover from the upper edge of the box, said spacer-cleat being removably held in place when the box or crate is closed, whereby the contents of the box may stand above the upper edge thereof without being crushed or bruised, and whereby when the box is opened the said contents will still stand above the sides and ends thereof.

2. A fruit box or crate comprising ends, sides, bottom and a removable cover, an independent spacer-cleat separating said cover from the upper edge of the box, said spacer-cleat being removably held in place when the box or crate is closed, the same nails or fastenings for holding the cover also extending through said spacer-cleat and into the upper edge of the box to detachably hold said spacer-cleat against the upper edge of the box, whereby the contents of the box may stand above the upper edge thereof without being crushed or bruised, and whereby when the box is opened the said contents will still stand above the sides and ends thereof.

In testimony whereof I have signed my name to this specification in the presence of two subscribing witnesses.

REGINALD H. SHOEMAKER, JR.

Witnesses:
B. K. SEFTON,
MARTIN FRY.